Feb. 15, 1966 L. PETERSEN 3,235,239
METHOD AND APPARATUS FOR MAKING CEMENT
Filed Dec. 23, 1963
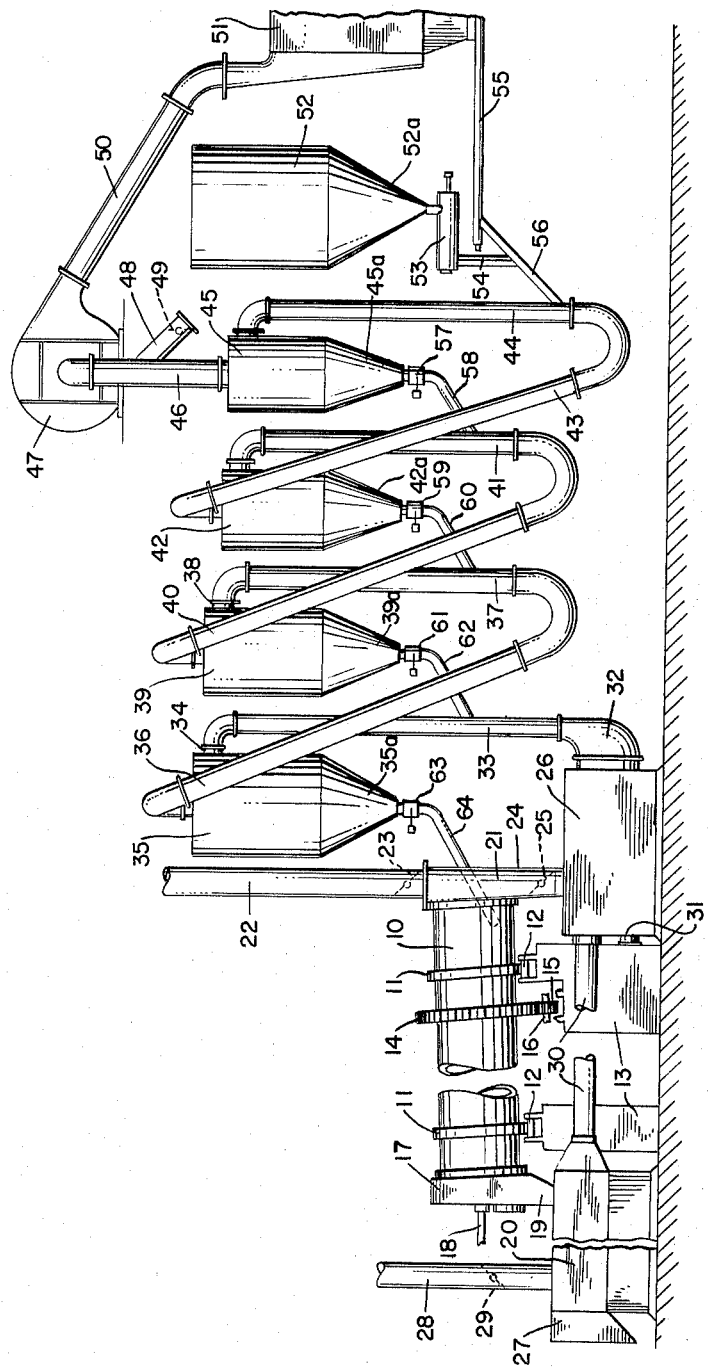
INVENTOR.
Louis Petersen
BY
Pennie Edmonds Morton Taylor Adams
ATTORNEYS

United States Patent Office 3,235,239
Patented Feb. 15, 1966

3,235,239
METHOD AND APPARATUS FOR MAKING CEMENT
Louis Petersen, Boca Raton, Fla., assignor to F. L. Smidth & Co., New York, N.Y., a corporation of Delaware
Filed Dec. 23, 1963, Ser. No. 332,584
4 Claims. (Cl. 263—32)

This invention relates to the production of cement by the dry process, in which the cement raw meal is successively dried, preheated, calcined, and burned to clinker. More particularly, the invention is concerned with a novel method of converting cement raw meal containing volatile constituents into cement clinker, in which such constituents are present in unobjectionable proportions. In addition to the method, the invention includes an apparatus by which the method may be advantageously practiced.

In the production of cement by the dry method, it is usual to introduce the cement raw meal into one end of a rotary kiln, in which fuel introduced at the other end is being burned. The meal travels through the kiln in countercurrent to the waste gases of combustion and, as a result of its absorption of heat from the gases, it is dried, preheated, calcined, and burned to clinker, which is cooled by atmospheric air in a cooler. The cooling air heated by contact with the clinker is then employed as secondary air of combustion in the kiln.

Nearly all cement raw materials contain volatile constituents in the form of alkalis or alkaline compounds and, in the calcining and burning stages in the kiln, a part of these constituents is volatilized and carried out of the calcining zone in the waste gases of combustion. The volatilized constituents are then sufficiently reduced in temperature to be condensed on the meal in the preheating and drying zones of the kiln and again carried into the calcining and clinkering zones of the kiln, where volatilization again takes place. Since only part of the constituents is volatilized in the calcining and clinkering zones in the kiln, the cycle of volatilization and condensation of the constituents results in a gradual increase in the proportions of the constituents in the clinker, until the alkali content of the clinker becomes objectionably high and the cement produced is unsound.

The present invention is, accordingly, directed to a novel method of producing cement from raw materials high in volatile constituents, the method making it possible to control the proportions of such constituents present in the clinker and thus maintain the constituents within acceptable limits. The method involves the use of a rotary kiln for carrying on the burning of the meal and, if necessary, a minor part of the calcination but the drying, preheating, and at least the major part of the calcination of the meal take place outside the kiln and are effected by causing the meal to be entrained and carried along in a stream of hot gases produced by burning fuel in a combustion space outside the kiln. A selected part of the waste gases from the kiln is then discharged into the atmosphere, while the remainder is supplied to the combustion space.

In the practice of the method, the discharge into the atmosphere of a part of the waste gases from the kiln makes it possible to keep the quantity of volatile alkalis and alkaline constituents in the hot gas stream within permissible limits. As a result, the objectionable cycle of alternate volatilization of these constituents in the kiln and condensation of the constituents on the raw meal is avoided, the raw meal enters the kiln without substantial alkali contamination, and the clinker produced has an acceptable alkali content. This is the main advantage of the method and it offers further advantages as follows.

Since only part of the total fuel consumed is burned in the kiln, a given output of clinker may be produced in a kiln shorter than would be required in conventional practice. Moreover, with the raw meal substantially completely calcined outside the kiln and introduced at a substantially constant temperature into the kiln, the chances of overburning or underburning the meal in the kiln and of the kiln becoming unbalanced are reduced. The use of a kiln of less than conventional length reduces the time of passage of the meal through the kiln so that, if the kiln becomes out of balance, less time is required to regain control of the burning operation.

The apparatus for practicing the invention includes a combustion chamber for producing hot gas, one or, preferably, more cyclone separators, through which a stream of hot gas from the chamber is passed, a rotary kiln, and a clinker cooler employing atmospheric air as the cooling medium. The cyclone separators and the clinker cooler are of ordinary construction but the kiln, although of conventional construction, is shorter than would be required in the production of a given output of cement in the usual way. The apparatus includes means for utilizing the heated cooling air for combustion purposes in the chamber and also means for employing a selected portion of the waste gases from the kiln and discharging the remainder into the atmosphere.

For a better understanding of the invention, reference may be made to the accompanying drawing, in which the single figure diagrammatically illustrates an installation of apparatus for carrying out the method of the invention.

The installation shown in the drawing comprises a rotary kiln 10 of conventional construction, which is encircled by live rings 11 running on conventional roller supports 12 mounted on foundations 13. The kiln is provided with a girth gear 14 driven by a pinion 15 mounted on a shaft 16, which is driven through a gear reducer by a prime mover in the usual way. The lower end of the kiln lies within a hood 17 and a burner pipe 18 extends through the hood and into the end of the kiln. A spout 19 leads from the bottom of the hood 17 into a clinker cooler 20. The upper end of the kiln extends into a smoke chamber 21, from the top of which a stack 22 containing an adjustable damper 23 discharges into the atmosphere. A pipe 24 containing an adjustable damper 25 leads from the bottom of the smoke chamber to a combustion chamber or furnace 26.

The furnace 26 is fired with any suitable fuel, such as oil, gas, coal, etc., and waste gases from the kiln in an amount determined by the setting of the dampers 23 and 25 are passed into the furnace through chamber 21 and pipe 24. The remainder of the kiln gases are then discharged from the chamber 21 past damper 23 through stack 22 into the atmosphere.

The cooler 20 is of any conventional construction, and the hot clinker issuing from the kiln is cooled by atmospheric air in the cooler and discharged through the outlet 27. A part of the cooling air which has been heated in the cooling of the clinker is discharged into the atmosphere through a pipe 28 containing an adjustable damper 29, while the remainder is passed through a pipe 30 into the furnace 26 to take part in the combustion of the fuel therein. The furnace is also provided with a controllable inlet 31 for admission of fresh atmospheric air, when necessary.

The hot gases from the furnace 26 pass through an elbow connection 32 into a riser pipe 33 leading to the tangential inlet 34 of a conventional cyclone separator 35. The air outlet of the separator is connected by a pipe 36 to a riser pipe 37 leading to the tangential inlet 38 of a second cyclone separator 39 and the air outlet from separator 39 is connected by a pipe 40 to a riser pipe 41 leading to the tangential inlet of a cyclone separator 42. The air outlet from the separator 42 is connected by a pipe 43 to a riser pipe 44 leading to the tangential inlet of a separator 45. The air outlet of separator 45 is connected by a pipe 46 to the intake of a fan 47 and an air inlet pipe 48 containing a damper 49 is connected to the pipe 46. The outlet of the fan 47 is connected by a pipe 50 to a filter 51, which is preferably a conventional electrostatic precipitator.

The raw meal to be converted into clinker is contained in a tank 52 and is discharged through the hopper bottom 52a of the tank into the casing of a screw conveyor 53 having an outlet spout 54 connected to a spout 56, which discharges into the riser pipe 44 near its lower end. The dust filtered from the gas stream entering the precipitator 51 passes into the casing of a screw conveyor 55 by which it is discharged into the spout 56.

The fan 47 draws a stream of hot gases from the furnace 26 through the separators 35, 39, 42, and 45 in succession and then forces the gas stream through the electrostatic precipitator. The raw meal introduced into the gas stream in the riser pipe 44 is entrained and carried in suspension in the stream into the separator 45. In its travel in suspension in the stream, the raw meal is heated and the solids are separated from the gas stream in separator 45 and discharged through the hopper bottom 45a of the separator and through a flap or similar valve 57 into a spout 58 leading into the riser pipe 41 near its lower end. The valve 57 permits the solid material to travel downwardly through the spout 58 while preventing gases from the pipe 41 from entering the separator 45. The meal entering the pipe 41 is carried upward in suspension in the gas stream flowing through the pipe and is heated during such suspension. In the separator 42, the meal is separated from the gas stream and discharged through the hopper bottom 42 of the separator and a valve 59 similar to the valve 57 into a spout 60 leading into the riser pipe 37 near the lower end thereof. The meal is entrained in the gas stream traveling upward through the pipe 37 and again heated during its travel in suspension. In the separator 39, the meal is separated from the gas stream and discharged through the hopper bottom 39a of the separator and a valve 61 similar to the valve 57 into a spout 62 leading into the riser pipe 33. The meal entrained in the gas stream traveling upwardly through the pipe 33 is further heated while in suspension in the stream. The meal is separated from the gases in the separator 35 and discharged through the hopper bottom 35a of the separator and a valve 63 similar to the valve 57 into a spout 64 which leads through the smoke chamber 21 and into the upper end of the kiln 10.

In the operation of the apparatus, the raw meal is heated in suspension in four stages and is successively dried, preheated, and substantially completely calcined. The calcined meal is then passed through the rotary kiln in countercurrent to the hot gases produced in the kiln by the combustion of fuel and is converted into clinker. The clinker discharged through the hood 17 into the cooler 20 is cooled and discharged through the spout 19. The hot gases which dry, preheat, and calcine the meal are derived partly from the furnace 26 and partly from the kiln and the secondary air of combustion required in the furnace is heated cooling air issuing from the clinker cooler 20. The relative proportions of the hot gases from the kiln supplied to the furnace and discharged through the stack 22 to the atmosphere are determined by the setting of the dampers 23, 25 and the adjustment of the dampers is varied in accordance with the proportions of volatile constituents in the raw meal. By proper adjustment of the dampers, a portion of these constituents in the starting material is discharged into the atmosphere so that the presence of an objectionable amount of the constituents in the clinker is avoided. Since the drying, preheating, and calcining of the raw material are effected outside the kiln and the kiln supplied with meal at a substantially constant temperature, the kiln may be shorter than a conventional kiln in a plant of the same output and there is less chance of overburning or underburning or of the kiln becoming out of balance.

I claim:

1. A method of burning cement raw meal containing volatile constituents which comprises burning fuel in a combustion space, maintaining a flow of hot waste gases from the combustion space to the atmosphere in a stream traveling continuously away from the space, introducing the raw meal into the stream to be entrained and heated while in suspension in the stream, separating the meal from the stream, introducing the separated meal into the stream for entrainment and heating therein and again separating the meal from the stream, repeating the steps of introducing into the stream the meal separated therefrom and separating the meal from the stream, the temperature of the gases and the heating of the meal thereby while in suspension in the stream being such that the meal is substantially completely calcined when finally separated from the stream, introducing the meal finally separated from the air stream into a rotary kiln for travel therethrough, burning fuel in the kiln and passing the waste gases through the kiln in countercurrent to the meal to burn the meal to produce clinker, discharging the clinker from the kiln and cooling it by heat exchange with atmospheric air, passing part of the air heated in cooling the clinker into the kiln for use in the burning of the fuel therein and another part of the air to the combustion space, and passing part of the waste gases from the kiln to the combustion space and discharging the remainder directly into the atmosphere.

2. The method of claim 1, in which the gas stream is filtered after the meal which was in suspension in the stream has been separated from the stream, and the dust removed by the filtration is added to raw meal about to be introduced into the stream.

3. An apparatus for burning cement raw meal containing volatile constituents which comprises a furnace, means for burning fuel in the furnace, means for maintaining a flow of waste gases from the furnace in a stream traveling continuously away from the furnace to the atmosphere, a plurality of means for introducing the meal into the gas to be entrained and heated in suspension therein to effect at least partial calcination of the meal, a plurality of means for separating the heated meal from the stream, the introducing and separating means lying in alternation along the gas stream with the several introducing means connected to respective separating means to receive meal therefrom, a rotary kiln, means for introducing the finally separated heated meal into the kiln to travel therethrough, means for burning fuel in the kiln and passing the waste gases through the kiln in countercurrent to the meal, the temperature within the kiln and the heating of the meal therein being such as to burn the meal and produce clinker discharged from the end of the kiln, means for cooling the clinker by contact with atmospheric air, means for conducting part of the air heated in cooling the clinker into the kiln and another part into the furnace to take part in the combustion of fuel in the kiln and furnace, respectively, and means for passing selected portions of the waste gases from the kiln to the atmosphere and to the furnace, respectively.

4. An apparatus for burning cement raw meal containing volatile constituents which comprises a furnace, means for burning fuel in the furnace, means for maintaining a flow of waste gases from the furnace in a stream traveling continuously away from the furnace to the atmosphere, means for introducing the meal into the gas to be entrained and heated in suspension therein to effect at least partial calcination of the meal, means for separating the heated meal from the stream, a filter for removing dust from the gases issuing from the separating means, means for adding the dust removed by the filter to the raw meal about to be introduced into the gas stream, a rotary kiln, means for introducing the separated heated meal into the kiln to travel therethrough, means for burning fuel in the kiln and passing the waste gases through the kiln in countercurrent to the meal, the temperature within the kiln and the heating of the meal therein being such as to burn the meal and produce clinker discharged from the end of the kiln, means for cooling the clinker by contact with atmospheric air, means for conducting part of the air heated in cooling the clinker into the kiln and another part into the furnace to take part in the combustion of fuel in the kiln and furnace, respectively, and means for passing selected portions of the waste gases from the kiln to the atmosphere and to the furnace, respectively.

References Cited by the Examiner

UNITED STATES PATENTS

| | | | |
|---|---|---|---|
| 1,596,509 | 8/1926 | Pike | 263—32 |
| 1,605,279 | 11/1926 | Pike | 263—32 |
| 2,965,366 | 12/1960 | O'Mara et al. | 263—32 |

WILLIAM F. O'DEA, *Acting Primary Examiner.*

JOHN J. CAMBY, *Examiner.*